United States Patent Office 3,488,975
Patented Jan. 13, 1970

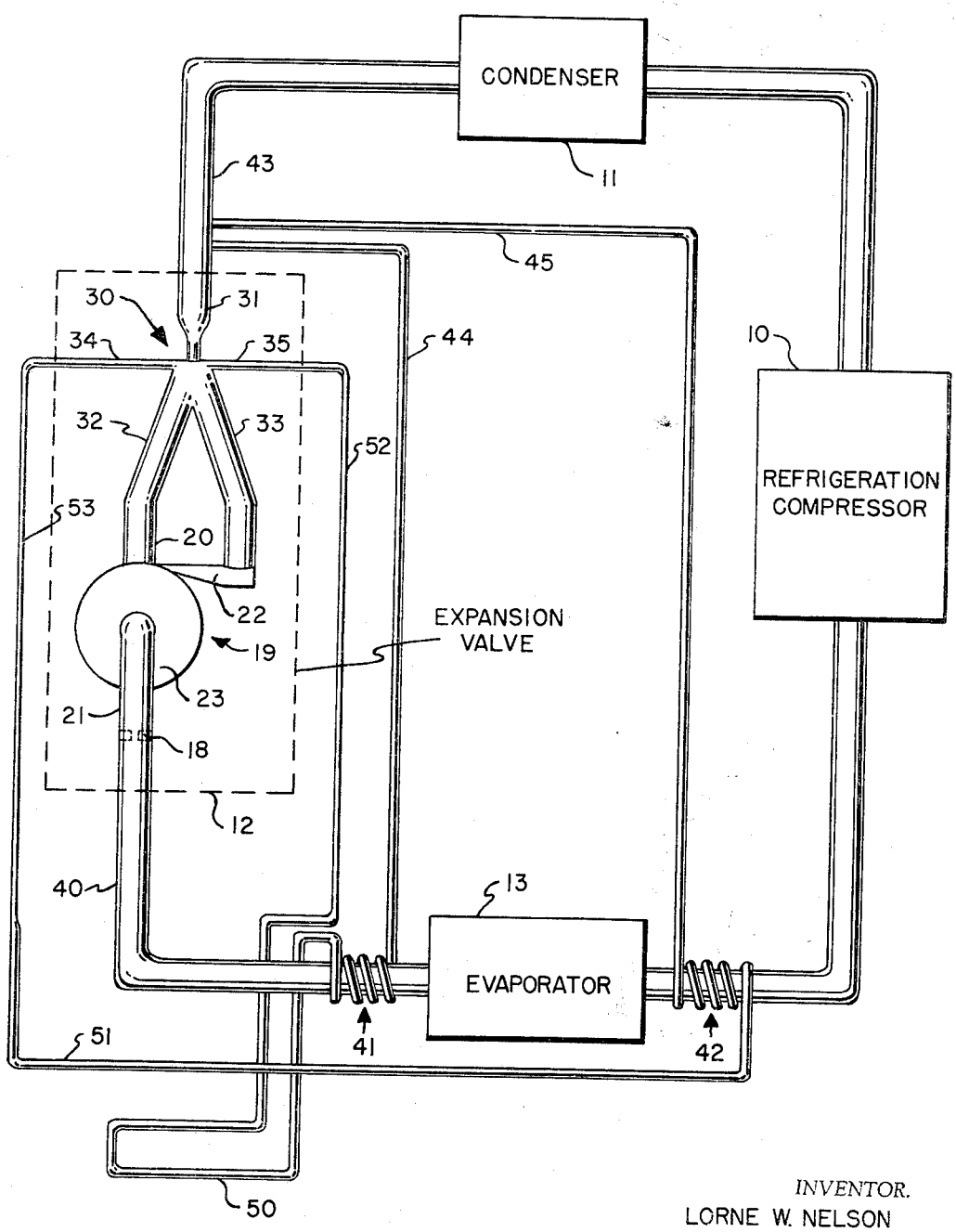

3,488,975
REFRIGERATION FLOW CONTROLLER EMPLOYING A VORTEX AMPLIFIER
Lorne W. Nelson, Bloomington, Minn., assignor to Honeywell Inc., Minneapolis, Minn., a corporation of Delaware
Filed Oct. 26, 1966, Ser. No. 589,679
Int. Cl. F25b 41/00, 43/00
U.S. Cl. 62—212     5 Claims

ABSTRACT OF THE DISCLOSURE

A refrigeration system utilizing as an expansion valve, a vortex amplifier providing a normal, relatively unrestricted, refrigerant flow passage and an alternate tangentially entering passage adapted to create a vortex and restrict refrigerant flow, and a fluid amplifier, controlled in response to the temperature differential between the inlet and outlet of the evaporator, and controlling the portion of the refrigerant which flows through the alternate passage.

---

The present invention is an improvement in a flow controller or expansion valve for controlling the flow of refrigerant in a refrigeration system. In particular, the flow controller is connected in the series flow path so the flow of refrigerant between a condenser and an evaporator is variably restricted to maintain the condition of the refrigeration system within predetermined limits. The flow controller is controlled in response to system variables effecting the operation of the refrigeration system to maintain a minimum amount of superheat in the evaporator; in particular, the temperature of the outlet of the evaporator is maintained at a predetermined level by adjusting the refrigerant flow.

In the present invention the flow controller comprises a variable fluid restrictor which has a by-pass or alternate flow path through which a portion of the normal flow can be directed to introduce a restriction in the total flow. The control of the alternate flow is accomplished by a fluid amplifier in response to an operating condition of the evaporator.

The single figure discloses the flow controller in the refrigeration system wherein the inlet and outlet temperatures of the evaporator are used as a control signal to interpose a variable restriction of the flow between the condenser and evaporator.

Referring to the figure, the refrigeration system made up of a refrigeration compressor 10, a condenser 11, a flow controller or expansion valve 12 and an evaporator 13. As the gas refrigerant is compressed by the compressor, heat is removed from the refrigerant by the condenser and the flow of liquid refrigerant to the evaporator is controlled by the expansion valve. As the liquid refrigerant evaporates in the evaporator, the flow of liquid to the evaporator is controlled to maintain some liquid in a greater part of the evaporator. If the flow is reduced the liquid in the downstream portion of the evaporator will turn to gas, which increases in temperature, and a superheat condition exists which reduces the cooling capacity of the evaporator. If too much liquid refrigerant flows to the evaporator, liquid refrigerant may flow on to the compressor. The desired operation is obtained by maintaining a minimum superheat or a predetermined gas temperature near the outlet portion of the evaporator.

The flow controller or expansion valve comprises a vortex amplifier or variable fluidic restrictor 19 having an input or power supply duct 20 and an outlet duct 21. Normal flow between the inlet and outlet ducts has some flow rate as determined by a fixed restriction such as indicated at 18. By means of fluid flow through a control inlet duct 22, which causes fluid to flow tangential to the normal fluid flow from duct 20, an alternate restricted flow is provided in a vortex manner causing the refrigerant to swirl around a chamber 23 before passing through the outlet duct 21. A proportional fluid amplifier 30 has a power or inlet supply duct 31 and two diverging outlet ducts 32 and 33 through which refrigerant flows proportionally depending upon the signal or fluid flow through one or the other or both of the control ducts 34 and 35. Outlet duct 32 is connected to the input duct 20; so that normal flow of refrigerant passes from supply duct 31 through the outlet duct 32 and through duct 40 to the evaporator. When the proper control signal is applied to control ducts 34 and 35 a portion of the fluid flow is diverted from supply duct 31 to outlet duct 33 so the vortex amplifier operates by causing a portion of the normal flow to be swirled around chamber 23.

The control of the vortex amplifier 19 with fluid amplifier 30 is accomplished by varying the flow of fluid to control ducts 34 and 35. My means of temperature responsive sensor means or ducts 41 and 42 which are wrapped around the inlet pipe and outlet pipe of evaporator 13 to be in thermal contact wtih the refrigerant passing through the evaporator, a signal indicative of the temperature of the fluid flowing in the evaporator is obtained. Ducts 41 and 42 are connected to a liquid refrigerant supply source 43 by the conduits 44 and 45 respectively. The downstream side of ducts 41 and 42 are connected by conduits 50 and 51 and restricted ducts or capillary tubes 52 and 53 to the control ducts 35 and 34 respectively.

As the liquid refrigerant flows through ducts 41 and 42, the amount of "flashing" or vaporization of the fluid in the capillary depends upon the temperature—the higher the temperature the greater the flashing and the smaller the control flow. As the liquid flows into sensors 41 and 42, the liquid is cooled. When the cooled liquid passes into the capillary tubes 52 and 53, the pressure will decrease along the capillary until the liquid reaches the saturation pressure and begins to evaporate or "flashes." The flow of fluid through the remaining length of the capillary beyond the point of flashing is additionally restricted with the presence of some gas. The fluid flow into control ducts 35 and 34 is therefore indicative of the temperature of the inlet and outlet of the evaporator respectively, and the fluid flowing into the control ducts of the fluid amplifier controls the proportion of fluid flow from the supply duct 31 to outlet duct 33.

The temperature at sensors 41 and 42 and the point where flashing in capillaries 52 and 53 occurs, governs the amount or rate of fluid flow into control ducts 35 and 34.

OPERATION

During normal operation of the refrigeration system, the refrigerant inlet temperature to the evaporator is low and the refrigerant outlet tempertaure where superheat occurs is higher at some predetermined temperature. The flow of liquid refrigerant from the condenser to the evaporator is controlled to maintain some liquid substantially throughout the evaporator while maintaining a small superheat at the outlet of the evaporator to insure only gas enters the compressor. With the desired superheat, the fluid flow into control duct 35 and the fluid flow into control duct 34 of amplifier 30 maintains the desired refrigerant flow to the evaporator. Amplifier 30 would be directing a portion of the liquid received from the supply duct 31 into outlet duct 33 and the liquid would pass through vortex amplifier 19 with a given amount of restricted flow.

Assuming that the cooling load of the evaporator decreased and the temperature at responsive means 42 indicative of superheat decreases, the temperature of the liquid leaving sensor 42 would be lower and a greater amount of fluid would flow into control duct 34. With an increase in the fluid flow into control duct 34, a proportional amount of fluid from supply duct 31 is diverted into outlet duct 33. The fluid flowing in outlet duct 33 enters control duct 22 to flow tangential to the main flow of liquid in supply duct 20 causing a diverting or swirling action of the fluid flow through the vortex amplifier which would increase the resistance to flow through the flow controller 12. The added resistance in the flow path from the condenser to the evaporator results in a decrease in the liquid flow until the superheat temperature at the outlet of the evaporator returns to normal.

Assuming that the load on the evaporator increased such that the initiation of the superheat condition takes place closer to the inlet of the evaporator, the temperature of sensor 42 increases and the fluid flow into the control duct 34 decreases. A greater proportion of the fluid flows from supply duct 31 through the main flow path of the vortex amplifier resulting in an increase in the fluid flow to the evaporator to reduce the amount of superheat and drop the temperature of sensor 42 to a normal condition.

By the use of both temperature response sensors 41 and 42, the variation in temperature produced by the superheat condition can be sensed. The refrigerant entering the evaporator always contains liquid at a certain temperature and thus the temperature entering the evaporator is a representative temperature with which the outlet temperature is compared to determine the superheat. By proper calibration of the sizing of the conduits, fluid amplifier and vortex amplifier, a predetermined amount of superheat can be maintained at sensor 42 to obtain the maximum use of the evaporator in the refrigeration system.

The embodiments of the invention in which an exclusive property or right is claimed are defined as follows:

1. A flow controller for use in a refrigeration system to control refrigerant flow comprising:
   an inlet supply duct adapted to be connected to a source of refrigerant,
   an outlet duct,
   a normal refrigerant flow passage between said inlet duct and said outlet duct,
   an alternate restricted refrigerant flow passage between said inlet duct and said outlet duct, and
   fluidic flow control means adapted to respond to an operating condition of the refrigeration system and operably connected in a flow controlling relationship with said normal and said alternate flow passages, said flow control means comprising;
       first temperature responsive means adapted to respond to an inlet refrigerant temperature of the evaporator, and
       second temperature responsive means adapted to respond to an outlet refrigerant temperature of the evaporator.

2. A flow controller as defined in claim 1 for use in a refrigeration system having an evaporator, said flow controller comprising:
   responsive means including said first temperature responsive means and said second temperature responsive means adapted to respond to the temperature differential of the refrigerant in an inlet and an outlet of the evaporator, and
   means connecting said responsive means in controlling relationship with a fluid amplifier and rendering said fluid amplifier operable to reduce the flow of refrigerant through said alternate passage.

3. A flow controller as defined in claim 1 wherein said first and second temperature responsive means are conduits adapted to carry refrigerant from a source to said fluidic flow control means and include portions adapted to be in thermal contact with the inlet and outlet, respectively, of the evaporator and said conduits are constructed so that the resistance to refrigerant flow therethrough increases with increasing temperature.

4. A flow controller as defined in claim 1 wherein said first and second temperature responsive means are conduits adapted to be in thermal contact with the inlet and outlet of the evaporator and said conduits are constructed so that when said conduits are connected to a source of refrigerant and to control inlets of a fluid amplifier, the fluid flow therethrough controls said fluid amplifier in response to the operation of the evaporator.

5. A flow controller for use in a refrigeration system having an evaporator to control refrigerant flow comprising:
   an inlet supply duct adapted to be connected to a source of refrigerant,
   an outlet duct,
   a normal refrigerant flow passage between said inlet duct and said outlet duct,
   an alternate restricted refrigerant flow passage between said inlet duct and said outlet duct, and
   fluidic flow control means adapted to respond to an operating condition of the refrigeration system and operably connected in a flow controlling relationship with said normal and said alternate flow passages, said flow control means comprising;
       temperature responsive means comprising an open continuous refrigerant flow through conduit adapted to be disposed in thermal contact with a portion of the evaporator whereby refrigerant flow through said conduit is adapted to vary with the temperature of the refrigerant therein which is responsive to the temperature of the evaporator, and
       means connecting said conduit to said fluidic flow control means to vary the flow of refrigerant through said evaporator to maintain a predetermined evaporator temperature.

References Cited

UNITED STATES PATENTS

| | | | |
|---|---|---|---|
| 2,914,925 | 12/1959 | Martin | 62—222 XR |
| 2,742,768 | 4/1956 | Baer | 62—210 |

MEYER PERLIN, Primary Examiner

U.S. Cl. X.R.

62—197, 225